United States Patent [19]
Dumais et al.

[11] Patent Number: 5,412,316
[45] Date of Patent: * May 2, 1995

[54] MAGNETOSTRICTIVE LINEAR POSITION DETECTOR WITH AXIAL COIL TORSIONAL STRAIN TRANSDUCER

[75] Inventors: Arthur Dumais, Rochester; Richard D. Koski, Troy, both of Mich.

[73] Assignee: Patriot Sensors and Controls, Clawson, Mich.

[*] Notice: The portion of the term of this patent subsequent to May 21, 2008 has been disclaimed.

[21] Appl. No.: 961,399

[22] Filed: Oct. 15, 1992

Related U.S. Application Data

[63] Continuation of Ser. No. 766,518, Sep. 27, 1991, abandoned.

[51] Int. Cl.⁶ .................... G01B 7/14; G01B 7/26; G01F 23/50
[52] U.S. Cl. .................... 324/207.13; 324/207.24; 324/207.22; 333/148; 73/290 V; 73/314
[58] Field of Search ............ 324/207.13, 207.22, 324/207.24; 333/148; 73/313, 314, 290 V

[56] References Cited

U.S. PATENT DOCUMENTS

| | | |
|---|---|---|
| 3,898,555 | 8/1975 | Tellerman . |
| 4,028,619 | 6/1977 | Edwards . |
| 4,238,844 | 12/1980 | Ueda et al. . |
| 4,305,283 | 12/1981 | Redding . |
| 4,510,587 | 4/1985 | Schneider . |
| 4,839,590 | 6/1989 | Koski et al. . |
| 4,939,457 | 7/1990 | Tellerman ............ 324/207.13 |
| 5,017,867 | 5/1991 | Dumais et al. . |
| 5,136,884 | 8/1992 | Lovett ............ 324/207.13 |

FOREIGN PATENT DOCUMENTS 827258 9/1957 United Kingdom .

OTHER PUBLICATIONS

IBM Technical Disclosure Bulletin vol. 22 No. 12 May 1980 "Transducers for a Magnetostrictive Positon Sensor" By: D. A. Thompson & T. K. Worthington.

*Primary Examiner*—Sandra L. O'Shea
*Assistant Examiner*—Warren S. Edmonds
*Attorney, Agent, or Firm*—Young, MacFarlane & Wood

[57] ABSTRACT

The present application discloses a magnetostrictive linear displacement detector with an axial coil torsional strain transducer. The displacement detector includes a magnetostrictive wire, a return wire and a magnet disposed for displacement along the magnetostrictive wire. A torsional strain sensor at the head end generates an electrical indication of the torsional strain within the magnetostrictive wire induced by passage of an electrical excitation by the position of the magnet. The torsional strain sensor includes two serially connected coils wound in opposite directions. The total length is short compared with the rate of electrical propagation within the magnetostrictive wire and long compared with the rate of torsional strain propagation within the magnetostrictive wire. The induced current within the two coils from electrical excitation of the magnetostrictive wire substantially cancel out because generally the whole sensor is excited simultaneously. The torsional magnetic disturbance accompanying the propagating strain, which is of a much narrower extent, generally induces current in only one of the two sections at a time. This transducer is advantageous because the response in not critically dependant on location.

2 Claims, 3 Drawing Sheets

FIG - 4
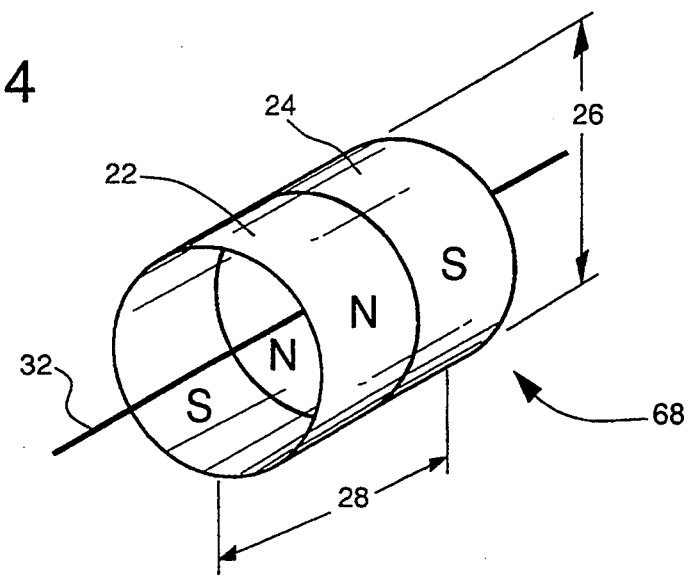
FIG - 5
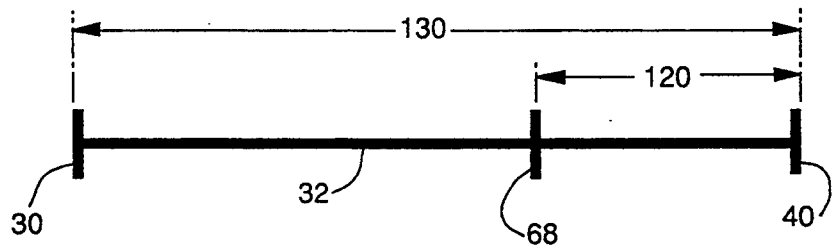
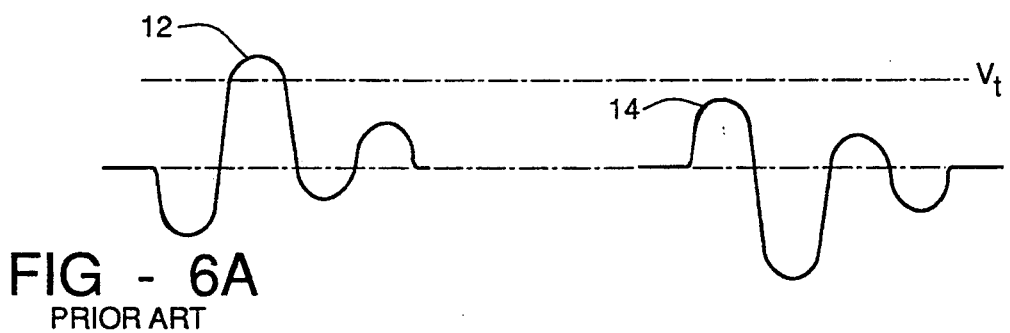
FIG - 6A
PRIOR ART
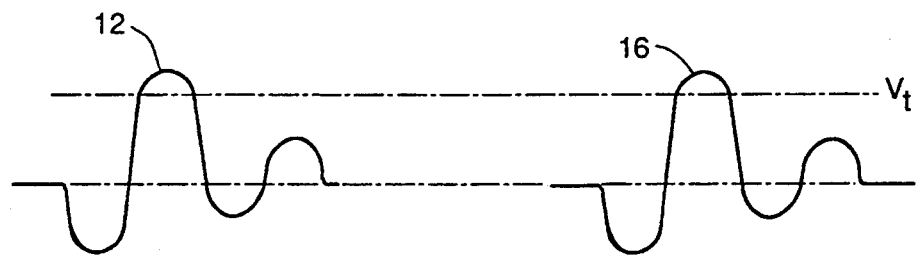
FIG - 6B

MAGNETOSTRICTIVE LINEAR POSITION DETECTOR WITH AXIAL COIL TORSIONAL STRAIN TRANSDUCER

This application is a continuation of Ser. No. 07/766,518, filed Sep. 27, 1991, now abandoned.

TECHNICAL FIELD OF THE INVENTION

This invention relates to linear position detectors of the type including a linear magnetostrictive wire. A magnet surrounds the magnetostrictive wire and marks the location to be measured. Such devices can operate with either mechanical or electrical excitation. The magnet generates an electrical signal when a torsional strain propagating along the wire reaches the area of influence of the magnet. Conversely, the magnet induces a torsional strain that travels in both directions when an electrical signal applied to the wire reaches the position of a magnet. Such linear position detectors are utilized, for example, as liquid level detectors and machine tool position detectors.

BACKGROUND OF THE INVENTION

The usefulness of the phenomenon of magnetostrictivity in linear distance or position measuring devices is recognized by the prior art; for example, see Redding, U.S. Pat. No. 4,305,283; McCrea et al, U.S. Pat. No. 4,158,964; Krisst, U.S. Pat. No. 4,071,818; Edwards, U.S. Pat. No. 4,028,619; and Tellerman, U.S. Pat. No. 3,898.555. Common to several of these devices are a magnetostrictive wire that runs in a straight line path through the measurement field, means for inducing a torsional strain at a given position along the wire, and a magnet that is displaceable along the wire, either by connection to a movable body such as a machine tool or by reason of association with a float device. Generally speaking, the position of the magnet represents the position of the monitored quantity and is determined as a function of the time required for a torsional strain to propagate from one end of the wire through the area of influence of the magnet or from the position of the magnet to a sensing apparatus located at one end of the wire.

Prior art magnetostrictive position detectors employing magnetic transducers typically use side mounted coils. Such sensing coils must be carefully located to be near a null in the magnetic field induced by the electrical transmission pulse. Otherwise the relatively large magnetic field induced by the electrical transmit pulse would overload the high gain amplifier connected to the sensing coil. This prior system results in a long settling time error at the amplifier creating a long dead band following initial transmission. Location at a magnetic null reduces this settling time. However, determination of the location of such a magnetic null is a difficult process that must be repeated for each design. In addition, the prior system can be adversely affected by small position changes of the sensing coil. Therefore there is a need in the art for transducers used with magnetostrictive position detectors that provide immunity to overloading during electrical excitation of the magnetostrictive wire.

SUMMARY OF THE INVENTION

The present application discloses a magnetostrictive linear displacement detector with an axial coil transducer. The displacement detector includes a magnetostrictive wire anchored at opposite ends. A return wire is connected to the foot end of the magnetostrictive wire. A magnet disposed for displacement along the magnetostrictive wire is at the position to be determined. The magnet includes a first section and a second section, each section having a toroidal shape around the magnetostrictive wire with radially disposed magnetic poles. The first magnet section has a south magnetic pole disposed inwardly and a north magnetic pole disposed outwardly while the second magnet section has a north magnetic pole disposed inwardly and a south magnetic pole disposed outwardly. The combination of the magnetostrictive wire and return wire is electrically excited. Arrival of the electrical pulse at the location of the magnet induces a magnetostrictive torsional strain in the magnetostrictive wire. This torsional strain propagates at a known rate to the axial coil transducer that detects the accompanying moving magnetic disturbance.

The axial coil transducer of this invention includes two serially connected coil sections. One section is axially wound in the clockwise direction and the other section is wound in the counter clockwise direction. The total length of the axial coil transducer along the magnetostrictive wire is short compared with the speed of electrical signal propagation within the magnetostrictive wire and large compared with the speed of torsional strain propagation within the magnetostrictive wire.

This axial coil transducer provides better immunity to currents induced by the electrical excitation. Prior art magnetic coil transducers were generally disposed perpendicular to the magnetostrictive wire. These transducers must be carefully located at a magnetic null relative to the electrical excitation to prevent prolonged overload of the sensing electronics. The axial coil transducer of this invention is substantially immune to currents induced by the electrical excitation. The electrical excitation generally induces opposing currents in the two coils that substantially cancel out. The narrower magnetic disturbance accompanying the torsional strain generally induces a current in only one of the two coils. Thus the desired signal is received while the undesired signal is canceled.

In the preferred embodiment the magnetostrictive position detector employs a direct and reflected torsional strain technique. A reflection termination is located at the foot end of the magnetostrictive wire and the head end is damped to prevent reflections. The displacement is determined from the interval of time between the detection of the torsional strain traveling directly from the magnet and the detection of the torsional strain reflected from the reflection termination. This provides an increased sensitivity and permits cancellation of any circuit induced delays that may drift with aging or change in temperature.

BRIEF DESCRIPTION OF THE DRAWINGS

These and other objects and aspects of the present invention will become clear from the following description of the invention, in which:

FIG. 4 is a detailed view of the position marking magnetic assembly employed in this invention;

FIG. 5 is a simplified view of the present invention illustrating quantities employed in the description of the invention;

FIGS. 6a and 6b illustrate a comparison of the waveforms generated according to the prior art and according to this invention.

DETAILED DESCRIPTION OF THE PREFERRED EMBODIMENT

Figure 1:
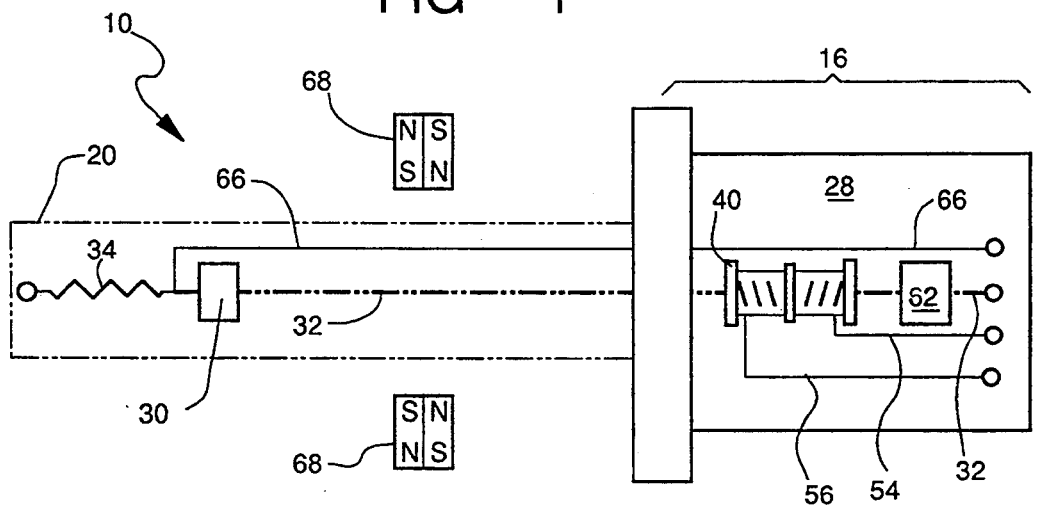
FIG. 1 is a schematic view of the present invention.

FIG. 1 illustrates in schematic form details of the mechanical and electromechanical components of magnetostrictive position detecting apparatus 10. The invention includes a head 16. A steel base plate 28 is connected in a centered position to accommodate certain electronic components hereinafter described and to provide a structure for the mounting of a magnetostrictive wire 32. Magnetostrictive wire 32 is preferably formed of nickel/iron alloy; a material known as Nispan C is suitable. Magnetostrictive wire 32 runs straight through the center of tube 20 and is secured at the head end by solder to a terminal on an insulating pad (not shown) that is secured to base plate 28. Magnetostrictive wire 32 extends through a hollow center of head 16 and, as previously mentioned, through the center of tube 20 along substantially the entire length thereof. At the foot end magnetostrictive wire 32 is secured by a tension spring 34 to the foot end of tube 20. Magnetostrictive wire 32 is held in spaced relationship relative to the interior walls of tube 20 by rubber spacers (not shown) that may occur at regular or irregular intervals along the entire length of tube 20. There is essentially no limit on the length of tube 20; i.e., transducers of 40 feet in length are just as feasible as those of only a few feet in length. Spring 34 ensures proper tension in the wire so that it runs straight and parallel through tube 20. Magnetostrictive position detecting apparatus 10 also includes a damping device 62 attached to the head end of wire 32. This damping device 62 may include a clamp plate and silicone rubber pads clamped to magnetostrictive wire 32. Damping device 62 serves to substantially absorb any propagating torsional strain received from the foot end and prevent reflections. The reason for damping such reflections will be explained below. Further details of the construction of a similar magnetostrictive position detecting apparatus 10 may be found in Koski et al, U.S. Pat. No. 4,839,590, which is assigned to the same assignee as this application.

Figure 2:
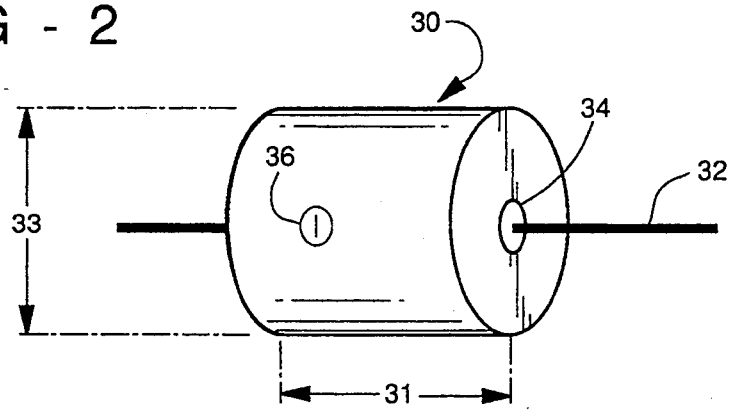
FIG. 2 is a perspective view of the reflection collar illustrated in FIG. 1.

A reflection collar 30 is secured to magnetostrictive wire 32 at the foot end. Reflection collar 30, which is illustrated in greater detail in FIG. 2, preferably consists of a cylindrical torus formed of a nonmagnetic material such as brass. Reflection collar 30 has a bore 35 sized to accommodate magnetostrictive wire 32. In the preferred embodiment magnetostrictive wire 32 has a diameter of approximately 0.025 inches. Reflection collar 30 preferably has a length 31 of 0.25 inches and a diameter 33 of 0.25 inches. In use, magnetostrictive wire 32 passes through the bore 35 for attachment to spring 34. Reflection collar 30 is secured to magnetostrictive wire 32 via set screw 36 that is disposed perpendicular to bore 34. Reflection collar 30 provides a mass discontinuity on magnetostrictive wire 32 that serves to reflect torsional strain arriving at the foot end of tube 20 back toward the head end. Reflection collar 30 is formed in this fashion to accommodate spring 34 for providing tension on magnetostrictive wire 32. If spring 34 is not required to provide tension on magnetostrictive wire 32, then the reflection termination can be any rigid mounting of magnetostrictive wire 32. The utility of such reflections will be detailed below.

An axial coil transducer 40 is provided in magnetic communication with magnetostrictive wire 32 near the head end. Axial coil transducer 40 generates an electrical signal upon detection of a torsional strain.

Figure 3:
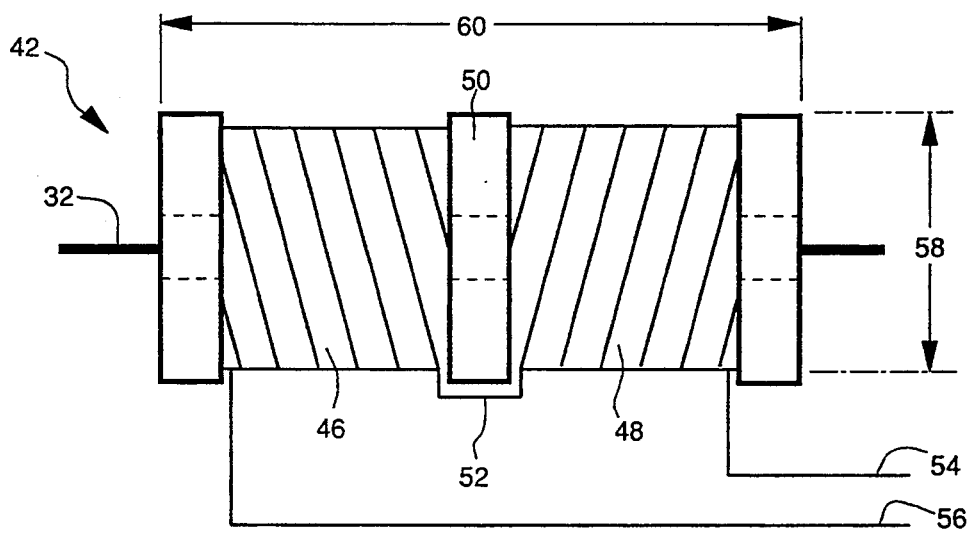
FIG. 3 is a side view of the axial coil transducer illustrated in FIG. 1.

As better illustrated in FIG. 3, axial coil transducer 40 comprises a coil 42 axially wound around magnetostrictive wire 32. Coil 42 is wound on a hollow nylon bobbin 44 having magnetostrictive wire 32 pass therethrough. Coil 42 includes two sections. First section 46 is wound in a clockwise direction. Second section 48, which is immediately adjacent to first section 46, is wound in a counter-clockwise direction. These sections are divided by a central shoulder 50 of nylon bobbin 44. The first and second sections of coil 42 are connected in series via jumper wire 52 forming a continuous loop from wire 54 to wire 56. The typical coil 42 will have a diameter 58 of about 0.25 inches and a length 60 of 0.50 inches. The particular winding should be selected to match the impedance of the electrical system connected to coil 42. A typical coil 42 would have the first section 46 formed of 750 turns of number 42 wire and the second section 48 also formed of 750 turns of number 42 wire. The diameter 58 of coil 42 can be selected as any size to accommodate the diameter of magnetostrictive wire 32 and the number of turns within sections 46 and 48. The length 60, however, is selected with regard to the speed of propagation of the torsional strain in the magnetostrictive wire 32. The length noted above is optimal for a magnetostrictive wire formed of Nispan C. The reasons for this construction will be detailed below.

The propagating torsional strain on magnetostrictive wire 32 can be sensed by axial coil transducer 40 as a moving magnetic disturbance. The arrival of the propagating torsional strain at the location of coil 42 is accompanied by a moving magnetic disturbance. This moving magnetic disturbance induces a voltage within coil 42. This induced voltage can be sensed by electronic components in a known manner.

The foot end of magnetostrictive wire 32 is electrically connected to a fine copper signal return wire 66 that passes in parallel spaced relationship to magnetostrictive wire 32 and through tube 20. The signal return wire 66 is connected to the electronics of magnetostrictive position detecting apparatus 10. Principal electronic components of magnetostrictive position detecting apparatus 10 are hereinafter described referring to FIG. 7.

Finally, a circular magnet 68 having radially arranged north and south poles is slidably disposed around tube 20 so that it may move along the length of tube 20 over the measurement range. In a liquid level detector magnet 68 is contained within a fluid tight float. Alternatively magnet 68 may be attached to a machine tool or other mechanical components whose position over a predetermined range is to be monitored.

Magnet 68 is preferably constructed as a cylindrical magnetic bipole. FIG. 4 illustrates this structure. Tube 20 is omitted from FIG. 4 for the sake of clarity. Magnet 68 includes two toroidal magnets. The first toroidal magnet 22 has radially disposed magnetic poles with the South pole directed inwardly and the North pole directed outwardly. Second toroidal magnet 24 is similar to the first toroidal magnet except that it has its North pole inwardly and its South pole outwardly. Magnet 68 has a diameter 26 sized to accommodate the tube 20. The length 28 is preferably less than 0.50 inches. This length 28 should be short in relation to the total length of the measurement range.

In the preferred embodiment magnet 68 is constructed of two strips of a flexible magnet material. Each strip has a length of 2 inches and a width of 0.25 inches. These strips are formed into cylinders as shown, with their poles of opposite polarity and disposed adjacently. Magnet 68 typically would be mounted on some non-magnetic assembly of a conventional design. Magnet 68 could be constructed of other types of magnets such as bar magnets, ceramic magnets or a single dual polarized flexible strip of magnet material. The essential feature is that magnet 68 have a short length and have the dual radially disposed poles. The reason for this construction will be detailed below.

The operation of the magnetostrictive linear displacement detector involves the interaction between magnetostrictive wire 32 and magnet 68. In the preferred embodiment, an electrical pulse is applied to the series combination of magnetostrictive wire 32 and return wire 66. This electrical pulse preferably has a short duration of approximately 5 microseconds. When this electrical signal reaches the position of magnet 68, a localized torsional strain is imparted to magnetostrictive wire 32 by the interaction of this electrical pulse and the magnetic fields of magnet 68. This localized torsional strain propagates along magnetostrictive wire 32 toward both the head and the foot ends at a known rate. A typical propagation rate for devices used for liquid level detection is about 9.3 microseconds per inch. The torsional strain propagating toward the head end is detected by axial coil transducer 40. The torsional strain propagating toward the foot end reflects from reflection collar 30 and travels back to the head end where it is also detected by axial coil transducer 40 at a later time. The length of time between the arrival of the direct and reflected torsional strains is a function of the position of magnet 68. It is a simple matter to convert this timing interval into a signal quantity representing the position of magnet 68 along tube 20. The position of magnet 68, in turn, represents liquid level or other monitored quantity. The provision of a reflection damping termination at the head end of magnetostrictive wire 32 serves to prevent any further reflected propagating torsional strain from interfering with this interval detection.

The impartation of an electrical pulse with detection of induced torsional strain is preferred for two reasons. Firstly, the application of electrical signals to magnetostrictive wire 32 serves a de-gausing function. Otherwise, magnet 68 may induce some residual magnetism in a part of magnetostrictive wire 32. This residual magnetism may cause hysteresis errors if magnet 68 is moving, particularly when magnet 68 reverses its direction. Secondly, the preferred operation reduces electrical noise in the detection. Coupling an electrical detector to magnetostrictive wire 32 results in a considerable effective antenna that can receive induced voltages. On the other hand, a torsional strain detector is small and can be easily shielded from induced voltages.

Prior art magnetostrictive position detectors employing magnetic transducers typically use side mounted coils. Such sensing coils must be carefully located to be near a null in the magnetic field induced by the electrical transmission pulse. Otherwise the large magnetic field induced by the electrical transmit pulse would overload the high gain amplifier connected to the sensing coil. This prior system results in a long settling time error at the amplifier creating a long dead band following initial transmission. Location at a magnetic null reduces this settling time. However, determination of the location of such a magnetic null is a difficult process that must be repeated for each design. In addition, the prior system can be adversely affected by small position changes of the sensing coil.

The special winding of coil 42 of this invention largely overcomes this problem in the prior art. Coil 42 looks like two coils coupled 180 degrees out of phase. The magnetically induced signal within first section 46 in response to the transmit pulse largely cancels out an opposite signal induced within second section 48. Thus the axial coil transducer 40 is generally insensitive to the transmit pulse regardless of its location. The torsional magnetic disturbance accompanying the desired magnetostrictive response is much narrower in extent. Thus the magnetostrictive response generally only intercepts one of the sections of coil 42, with the other section unexcited. Thus axial coil transducer 40 produces a signal from the sum of the excitation of the two coil sections.

The distinction is possible due to the large difference in propagation speed between the electrical transmit pulse and the magnetostrictive response. The electrical pulse travels through magnetostrictive wire 32 at nearly one hundred thousand times as fast as the torsional strain pulse. Coil 42 has a length very short in relation to the propagation speed of the electrical pulse. Thus the excitation of the two coil sections generally cancel out. On the other hand, coil 42 is long in relation to the propagation speed of the magnetostrictive response. This permits separate, independent excitation of the coil sections. This construction is advantageous because the cancellation of the response to the transmit pulse is independent of the location of axial coil transducer 40.

The reflection technique increases the distance resolution obtainable with the same timing accuracy as compared with the prior art. This improvement in resolution will be explained referring to FIG. 5. Note that while the following description deals with the case of electrical excitation and mechanical detection, the same time intervals are involved in mechanical excitation and electrical detection. Referring now to FIG. 5, let the distance 120 from axial coil transducer 40 to magnet 68 be D and the distance 130 from axial coil transducer 40 to reflection collar 30 be T. Also let $R_e$ and $R_m$ be the respective rates of electrical and torsional strain propagation within magnetostrictive wire 32.

The time $t_1$ from the generation of an electrical pulse along magnetostrictive wire 32 to the receipt of the direct torsional strain is given by:

$$t_1 = \frac{D}{R_e} + \frac{D}{R_m} + \Delta t_1 \tag{1}$$

representing the time of propagation of the electrical pulse to magnet 68 and the time of propagation of the torsional strain back to axial coil transducer 40 and where $\Delta t_1$ is the inherent delay time of the electronic system. Note this ignores any small difference in distance between the location of the electrical excitation and the location of axial coil transducer 40. Solving (1) for D we find that:

$$D = \frac{R_e R_m}{R_e + R_m} (t_1 - \Delta t_1) \tag{2}$$

From the prior discussion $R_m$ is approximately 9.3 microseconds per inch. The rate of electrical propagation $R_e$ is near the speed of light or about 85 picoseconds per inch. Thus $R_e$ is approximately one hundred thousand times greater than $R_m$. Equation (2) can thus be approximated as:

$$D = R_m(t_1 - \Delta t_1) \tag{3}$$

The rate of change of D with respect to a unit change in $t_1$ is computed from equation (3) as:

$$\frac{dD}{dt_1} = R_m \tag{4}$$

indicating the resolution is proportional to the rate of propagation of the torsional strain.

The present invention employs the time of receipt of a torsional strain reflected from reflection collar 30. The time $t_2$ from the generation of an electrical pulse along magnetostrictive wire 32 to the receipt of the reflected torsional strain is given by:

$$t_2 = \frac{D}{R_e} + \frac{T-D}{R_m} + \frac{T}{R_m} + \Delta t_2 \tag{5}$$

representing the time of propagation of the electrical pulse to magnet 68, the time of propagation of the torsional strain to reflective collar 30, the time of propagation of the reflected torsional strain from reflective collar 30 back to axial coil transducer 40, and where $\Delta t_2$ is the inherent delay time in the electronic system.

In accordance with this invention, the distance D is determined from the time interval between the detection of the direct and reflected torsional strains. This time interval $t_3$ is $t_2$ minus $t_1$ given by:

$$t_3 = \left\{ \frac{D}{R_e} + \frac{T-D}{R_m} + \frac{T}{R_m} + \Delta t_2 \right\} - \left\{ \frac{D}{R_e} + \frac{D}{R_m} + \Delta t_1 \right\} \tag{6}$$

We can assume that the circuit delay does not change appreciably between these torsional strain detections and therefore $\Delta t_1 = \Delta t_2$. Simplifying equation (6) we have:

$$t_3 = \frac{2T}{R_m} - \frac{2D}{R_m} \tag{7}$$

Note that all the terms including $R_e$ cancel out in equation (7). Thus removal of the dependency on $R_e$ does not require resort to an approximation. Solving equation (7) for D we have:

$$D = T - \frac{R_m t_3}{2} \tag{8}$$

The rate of change of D with respect to a unit change in $t_3$ is computed from equation (8) as:

$$\frac{dD}{dt_3} = -\frac{R_m}{2} \tag{9}$$

indicating the rate of change of D with a unit change in $t_3$ is half of that indicated by equation (4). Thus the present invention provides greater resolution by employing the time interval between the receipt of the direct and reflected torsional strain pulses. Note also that the contribution of any circuit delays are minimized based upon the subtraction of two similar detections.

Prior art magnetostrictive position detectors employ a magnet with a radially disposed pole of only a single polarity rather than the dual pole structure illustrated in FIG. 4. The dual pole structure is advantageous for several reasons. The single radially disposed magnet of the prior art produces identical torsional strain pulses traveling in both directions. The direct torsional strain received by transducer 40 generally has the form of a damped sine wave 12 as illustrated in FIG. 6a. The torsional strain reflected from reflection collar 30 has an inverted phase. This produces a response at transducer 40 that is 180 degrees out of phase with the direct response as illustrated at 14 in FIG. 6a. The electrical detector coupled to transducer 40 thus must detect different portions of the waveforms 12 and 14. As illustrated in FIG. 6a a threshold detector set at a voltage $V_t$, a level selected for proper noise immunity detection of waveform 12, would not detect waveform 14. In any event it is difficult to provide reliable detection at the same location of the two waveforms 12 and 14 because of their differing shape. It is possible to provide an electrical phase inversion of the reflected response before detection. However, this negates the advantage of the reflection technique in canceling out delays in the electrical system. This is because the two waveforms must be processed differently and thus could encounter differing delays under differing conditions resulting in potentially unreliable position detection.

The dual pole structure of the present invention eliminates this problem. Because of the differing poles the propagating torsional strains having differing polarities. Upon reflection from reflection collar 30 the waveform 16 then has the same form as the directly received waveform 12. Thus the same detection technique provides consistent results for these two waveforms. This permits the advantages of the reflection technique to be more fully realized.

The dual pole structure has other advantages that are valuable in non-reflection systems. The dual pole structure illustrates in FIG. 4 generates a torsional strain that is about 30% to 70% greater than that of the prior art single pole magnet. This higher signal leads to improved noise immunity. This higher signal level is believed to be due to an inherent advantage in "full wave" response of the dual pole magnet response as compared with the "half wave" response of the prior art single pole magnet.

The dual pole magnet of this invention provides reduced magnetic hysteresis and improved linearity. It is known in the art that it is possible for residual magnetism to remain in magnetostrictive wire 32 after movement of the magnet. This residual magnetism can generate possibly interfering magnetostrictive responses. A rapidly reversing magnetic field of the dual pole magnet of this invention sweeps magnetostrictive wire 32 upon magnet motion. The reversing magnetic field is believed to condition the magnetostrictive wire to remove remnants of the previous magnetic history. As a consequence there is improved performance because of reduced residual magnetism.

Figure 7:
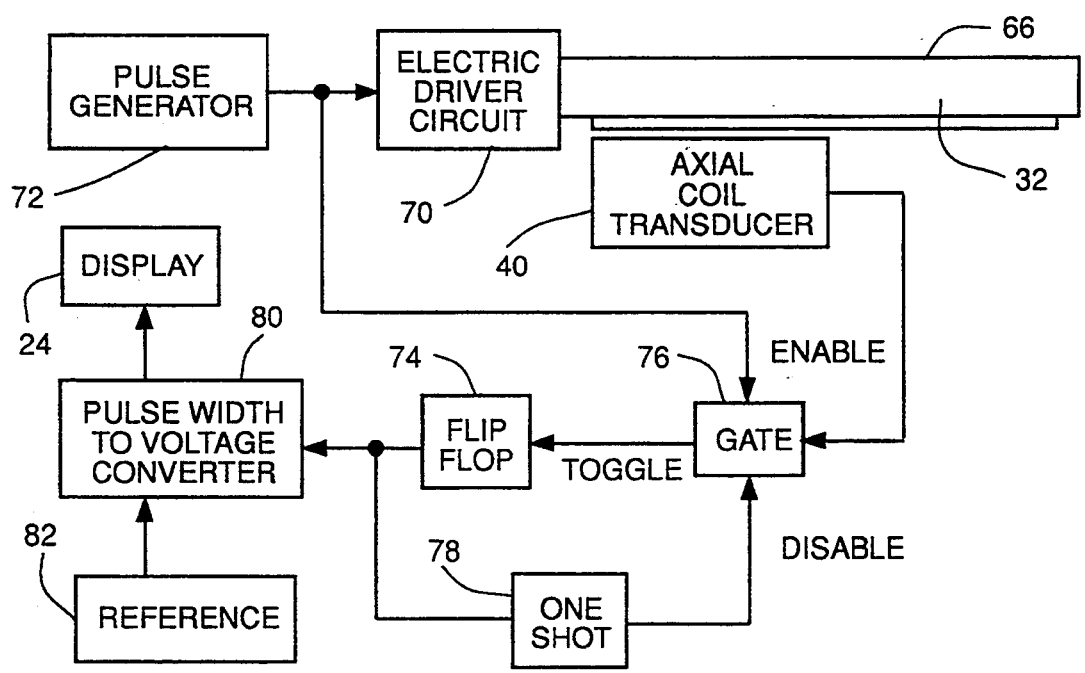
FIG. 7 is a block diagram of the electronics in accordance with the preferred embodiment of the present invention.

Referring now to FIG. 7, a block diagram of the preferred electronic system will be described. Pulse generator 72 produces electrical pulses of known and stable duration. For electrical excitation of magnetostrictive wire 32 this duration is approximately 5 microseconds. The pulse generator 72 may be actuated by a clock signal or upon demand as suits the system designer. The time between pulses produced by pulse generator 72 must be at least as great as the time required for torsional strain to travel from the nearest position magnet 68 can travel toward the head end of magnetostrictive wire 32 to reflection collar 30 located at the foot end and hence back to axial coil transducer 40. If axial coil transducer 40 is very near the head end of magnetostrictive wire 32, this duration is generally time for the torsional strain to make one round trip from the head end to the foot end of magnetostrictive wire 32. Pulse generator 72 produces a pulse that is applied to electric driver circuit 70 to impart an electrical pulse on the series combination of magnetostrictive wire 32 and return wire 66. The output of pulse generator 72 is also connected to the enable input of gate 76, thereby permitting gate 76 to pass signals applied to its input.

Axial coil transducer 40 is coupled to magnetostrictive wire 32 to detect the arrival of propagating torsional strain. The detection of the first torsional strain directly from magnet 68 passes through gate 76 (which was previously enabled via pulse generator 72) to change the state of a bistable device such as a flip-flop 74 to mark the beginning of a measured timing interval. The detection of the second torsional strain reflected from reflection collar 30 also passes through gate 76 to return flip-flop 74 to its original state and mark the end of the timing interval.

One shot 78 is connected the output of flip-flop 74. One shot 78 is constructed to generate a pulse of a predetermined duration upon detection of return of the output of flip-flop 74 to its original state. This pulse is supplied to the disable input of gate 76, thereby closing this gate until it is enabled by the next pulse from pulse generator 72. Thus gate 76 is enabled only during the interval between generation of the pulse by pulse generator 72 and the reception of the second torsional strain by axial coil transducer 40. This serves to prevent the generation of extraneous position signals.

Flip-flop 74 thus produces a pulse having a width equal to the timing signal interval; i.e., equal to the time interval between the receipt of the first pulse from axial coil transducer 40 and the receipt of the second pulse from axial coil transducer 40. Flip-flop 74 supplies this timing interval to a pulse width to voltage convertor 80. The device 80 may take several forms including the form of a high frequency digital pulse counter whereby the number of accumulated pulses during the timing interval represents liquid level. Alternatively device 80 may comprise a ramp voltage generator receiving a closely controlled voltage from reference source 82 and appropriate sample-and-hold circuitry for determining the amplitude that the ramp voltage achieves during the timing interval. In any event the output of converter 80 is connected to remote display 24 which, as previously described, may vary in sophistication over a wide range.

We claim:
1. A magnetostrictive linear displacement detector comprising:
 a magnetostrictive wire having opposite head and foot ends and defining a measurement interval therebetween;
 a return wire having a foot end electrically coupled to said foot end of said magnetostrictive wire and a head end;
 a magnet disposed for displacement along the said magnetostrictive wire within said measurement interval, the position of said magnet within said measurement interval being the linear displacement detected;
 said magnet including
  a first magnet section having a toroidal shape around the magnetostrictive wire with radially disposed magnetic poles, a south magnetic pole disposed inwardly and a North magnetic pole disposed outwardly; and
  a second magnet section disposed adjacent to said first coil section, having a toroidal shape around the magnetostrictive wire with radially disposed magnetic poles, a North magnetic pole disposed inwardly and a South magnetic pole disposed outwardly;
 an electrical excitation means electrically coupled to said head end of said magnetostrictive wire and said head end of said return wire for producing a predetermined electrical excitation through said magnetostrictive wire and said return wire; and
 a torsional strain sensor disposed proximate to said head end of said magnetostrictive wire for generating an electrical indication of torsional strain within said magnetostrictive wire, said torsional strain sensor including
  a first coil section axially wound in a clockwise direction around the magnetostrictive wire for a length parallel to the magnetostrictive wire, and
  a second coil section disposed adjacent to said first coil section, connected in series with said first coil section and axially wound in a counterclockwise direction around the magnetostrictive wire for a length parallel to the magnetostrictive wire, the total length of said first and second coil sections selected to be short in relation to the speed of propagation of electrical signals through the magnetostrictive wire and long in relation to the speed of propagation of torsional strain through the magnetostrictive wire.

2. The magnetostrictive linear displacement detector as claimed in claim 1, wherein:
 said first and second magnet sections together have a length along the magnetostrictive wire of no more than one half inch.

* * * * *